April 17, 1928. 1,666,861
E. H. McFARLAND
AIR TESTING AND INFLATING MEANS
Filed July 15, 1926
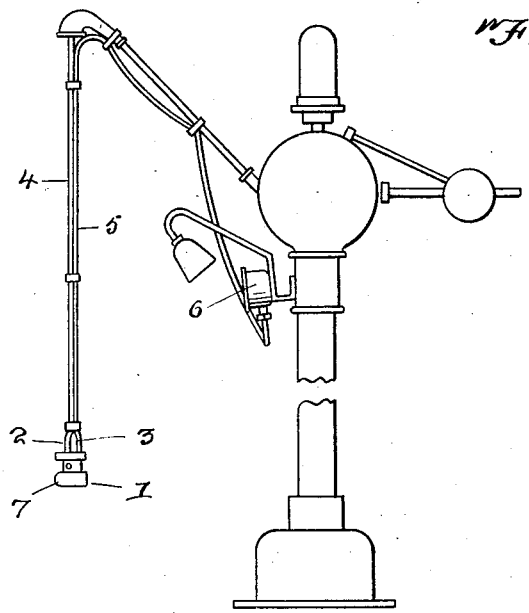
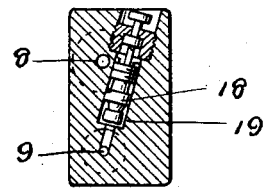
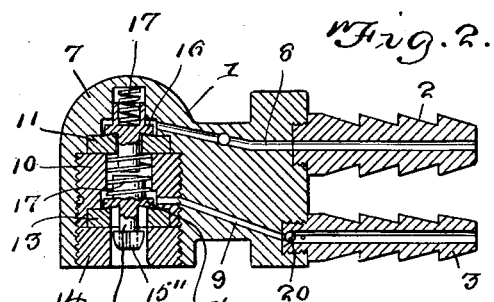
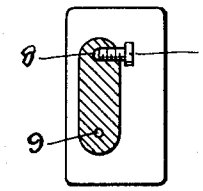
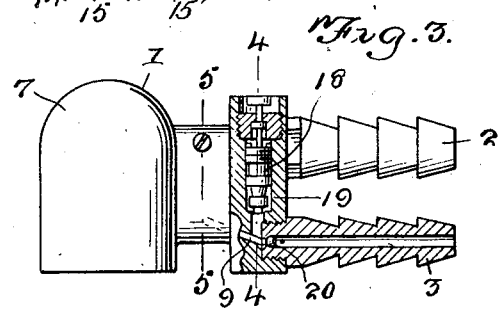
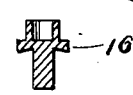
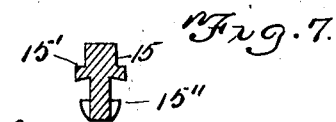
E. H. Mc. Farland
INVENTOR
BY Victor J. Evans
ATTORNEY
WITNESS:

Patented Apr. 17, 1928.

1,666,861

UNITED STATES PATENT OFFICE.

ERNEST HOLT McFARLAND, OF LOUISBURG, NORTH CAROLINA, ASSIGNOR OF ONE-HALF TO JAMES A. HODGES, OF LOUISBURG, NORTH CAROLINA.

AIR TESTING AND INFLATING MEANS.

Application filed July 15, 1926. Serial No. 122,695.

This invention relates to a tire inflating device, the general object of the invention being to provide means for visibly indicating the pounds pressure of air in a pneumatic tire or other pneumatic device, with means for admitting air to the tire without removing the chuck of the air supply device from the valve stem if more air is to be introduced into the tire.

A further object of the invention is to provide a release valve for permitting air to escape from the tire and from the gauge.

A further object of the invention is to provide adjustable means for controlling the size of the passage between the supply tank or pump and the outlet of the valve stem engaging chuck.

The present invention is an improvement over that forming the subject matter of a patent granted to me on April 13, 1926, No. 1,581,007.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view of an inflating stand having my invention applied thereto.

Figure 2 is a sectional view through the improved chuck.

Figure 3 is an elevation of the chuck, with parts in section, showing the release valve.

Figure 4 is a section on line 4—4 of Figure 3.

Figure 5 is a section on line 5—5 of Figure 3.

Figure 6 is a view of the valve.

Figure 7 is a view of the plunger.

Figure 8 is a view of the plug which is inserted in the threaded hole in the chuck.

Figure 1 shows the same arangement of parts as is shown in the before mentioned patent, though it will, of course, be understood that the invention can be used with other types of air supplying devices. The improved chuck is shown at 1 and has its nipples 2 and 3 connected respectively with the air supply tube 4 and the tube 5 which leads to the air gauge 6. The head is provided with a socket 7 and passages 8 and 9, the passage 8 connecting the inner end of the socket with the nipple 2 and the air line 4, while the passage 9 connects the central part of the socket with the nipple 3 and the gauge line 5. A plug 10 is threaded in the large part of the socket and holds in place the washer 11 and a washer 13 is held in a recess in the outer end of the plug by a nut 14. The washers form seats for the flange 15' of a plunger 15 and a valve 16, the valve and plunger being held on their seats by the springs 17. The plunger is provided with an enlarged lower end 15'' which is adapted to engage the end of a valve in a valve stem of a tire, when the chuck is applied to the stem, so as to move the flange of the plunger off its seat. As will be seen, when the chuck is applied to a valve stem and slight pressure applied thereto, the plunger 15 will be moved so that some of the air in the tire will pass into the bore of the plug through the passage 9 and nipple 3 into plug through the passage 9 and nipple 3 into the line 5 so that it will act on the gauge 6, and this gauge will indicate the amount of pressure in the tire. In this action, the valve 16 is not disturbed. If the pressure is low and more air must be introduced into the tire, then greater pressure is placed on the chuck so that the upper end of the plunger 15 will strike the depending stem of the valve 16 and force the said valve 16 off its seat. This will permit air to flow from the air supply through the line 4, passage 8 into the socket, where it will flow through the plug 10 and nut 14 into the valve stem. Some of this air will also act on the gauge through the passage 9 and line 5, so that the pressure in the tire can be ascertained at a glance by looking at the gauge and as soon as the pressure is sufficient, the chuck is removed from the tire.

I provide a release valve 18 in the chuck, the chamber 19 of which is in communication with the passage 9, so that when the head on the stem of this release valve is depressed, the air in the tire and in the gauge can escape through the valve 18 and thus excessive pressure in the tire can be reduced. This valve 18 is of the usual construction. I also place a small check valve 20 in the nipple 3, which causes the air to escape slowly from the gauge 6. An adjustable screw 21 is arranged in the chuck for controlling the flow of air through the passage 8. This keeps the flow of air into the chuck constant.

From the foregoing, it will be seen that I have provided means whereby the pressure in a tire can be readily ascertained by placing the chuck on the stem of the plunger and slightly pressing upon the same. If the tire should need more air, a greater pressure is exerted upon the chuck so as to open the air controlling valve, which will permit air to flow into the tire from the supply. This air will also act on the gauge so that the user can see the mounting pressure and thus remove the chuck from the stem when the desired pressure has been reached. If too much air has been introduced into the tire, this can be easily allowed to escape by opening the valve 18. This valve 18 also holds the air in the gauge so that plenty of time is given the user to read the gauge. After the valve 18 is opened, the air will escape by the check valve 20. When using the release valve to reduce the tire pressure, as soon as the gauge drops to the desired degree, the finger can be removed from the release valve to prevent further escape of air.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A chuck for an air supply comprising a body having a socket, and being formed with upper and lower passages which communicate with said socket, a hose nipple for each passage and the nipple for the upper passage being in communication with an air supply and the lower nipple with a gauge, a plug threaded in part of the socket and being formed with a recess in its bottom, a washer in the recess, a nut threaded in said socket for retaining said washer in said recess, a washer on the upper end of the plug, a valve controlling the upper passage, a spring influencing the valve to hold the same on the upper washer, a spring influenced plunger having a flange which normally engages the lower washer for closing the lower passage and said plunger adapted to unseat a tire valve and the valve for the upper passage, as and for the purpose set forth.

In testimony whereof I affix my signature.

ERNEST HOLT McFARLAND.